May 29, 1956  F. W. GREEN  2,747,263
CAR TURNOVER DEVICE
Filed Sept. 26, 1951 7 Sheets-Sheet 1

INVENTOR.
Frank W. Green
BY
Wayne Morris Russell
Attorney

INVENTOR.
Frank W. Green
BY
Wayne Morris Russell
Attorney

May 29, 1956 — F. W. GREEN — 2,747,263
CAR TURNOVER DEVICE
Filed Sept. 26, 1951 — 7 Sheets-Sheet 3

INVENTOR.
Frank W. Green
BY Wayne Morris Russell
Attorney

INVENTOR.
Frank W Green
BY
Wayne Morris Russell.
Attorney

May 29, 1956 F. W. GREEN 2,747,263
CAR TURNOVER DEVICE
Filed Sept. 26, 1951 7 Sheets-Sheet 7

INVENTOR.
Frank W. Green
BY
Wayne Morris/Russell
Attorney

United States Patent Office 2,747,263
Patented May 29, 1956

2,747,263
CAR TURNOVER DEVICE

Frank W. Green, Fairfield, Ala., assignor to Pullman-Standard Car Manufacturing Company, Chicago, Ill., a corporation of Delaware Application September 26, 1951, Serial No. 248,413

4 Claims. (Cl. 29—284)

The present invention relates to a turnover device for railway cars and like structures which present difficulties in handling during construction or repair.

In the construction, assembly, or repair of railway cars and similar heavy or unwieldy articles, it is often highly desirable, if not absolutely necessary, to turn the article from upright to inverted position or an intermediate position for safety or convenience in working on certain parts thereof, as for example to eliminate overhead welding. Apparatuses of different kinds have been used for this purpose, but while they accomplish the actual turning satisfactorily enough, they are generally expensive, large and unwieldy, require expensive, space-consuming installation facilities, are limited to use in a fixed location, interrupt operations while being installed, sometimes for long periods, and have other disadvantages. The present invention provides a turnover device eliminating these disadvantages and otherwise affording advantages over prior apparatus of this type.

In the illustrated embodiment of the invention, there is provided a supporting plate adapted to be suspended by a hoist or the like and carrying in fixed relation an external ring gear. An elongated attaching plate has fixed to one face a roller or shaft element which is disposed in the ring so that the plate may rotate about the gear axis. On its other face, spaced from the gear axis, the plate has a thrust block for disposition in the end of a railway car striking casting, which it is dimensioned to fit closely. Securing means are provided to prevent disengagement of the parts. A mounting plate is disposed parallel to the attaching plate and fixed thereto by rigid attachment to the shaft element so as to lie on the opposite side of the gear from the attaching plate. On the mounting plate is secured a motor with its shaft coupled to the input shaft of a speed reducer, the output shaft of which drives a pinion meshing with the ring gear. Thus when the motor is operated, the pinion travels around the gear and causes the mounting and attachment plates to rotate about the gear axis and turn the car, which at its other end may be supported by an idling device similar to the turnover device but having no driving means. A load brake is provided so that the car may be held in any desired position, of a type which is automatically applied when the motor is stopped and released when the motor is operated, preventing rotation of the attaching plate relative to the ring gear.

The idling device or assembly, which may conveniently be formed of parts substantially the same as parts used in the turnover or working device, provides a simple means to aid in supporting the car, and while it may be replaced by other supporting means, is advantageous in that it is applied in the same manner as the turnover device, is automatically aligned therewith when applied, and may be supported and moved vertically and horizontally in the same manner and to the same extent.

It will be seen that the invention provides a very compact, relatively light and small unit which is inexpensive, readily applied, and simple in construction and operation, in marked contrast to the usual large, unwieldy, and expensive apparatus employed for the same purpose. Even more important is the fact that the device is not limited to use in a fixed location, but may be easily moved to various parts of a shop for use or for storage when not needed, and does not require pits or bases for installation, since it is not installed in the usual sense because of its mobile character. The device may be used to move a car in either normal or turned position, and is therefore applicable to assembly line operation. The axis of rotation of the attaching plate preferably is located so as to pass substantially through the center of gravity of the car, facilitating rotation, maintaining stability, and imposing minimum load on the motor and brake. The device is adapted not only to turn a car completely over, but to tilt the car to any desired position and hold it at the desired angle. Although the present device is applicable to any type of railway car, it is not limited to use therewith, for it may be employed in the construction or repair of motor trucks and the like, airplanes, structural sub-assemblies, and similar heavy and unwieldy objects, the securing means being modified if necessary or desirable. The device of this invention may also be employed for dumping railway cars or the like by turning them bodily. The invention contemplates the use of the turnover and idling devices as separate parts of a turnover means for such objects.

It is an object of the invention to provide a car turnover device which is relatively small, light, compact, and inexpensive.

Another object is the provision of a car turnover device adapted to rotate a car about a horizontal axis through an arc of at least 180° and position the car at any desired angle within the arc.

It is another object to provide a car turnover device applicable to any type of railway car and to other like heavy articles or objects the handling of which presents difficulties.

Another object is the provision of a car turnover device which is not confined to a single location, but is mobile and may be moved about a shop either independently or carrying a car.

Another object is the provision of a car turnover device which does not obstruct or restrict working space.

A further object of the invention is the provision of a car turnover device which does not require pits or bases for its use.

Another object is the provision of a car turnover device adapted to turn a car about substantially its center of gravity so as to afford maximum ease and safety in operation.

It is another object of the invention to provide an idling car turnover device adapted to rotatably support a car at one end for turning thereof by other means.

It is also an object to provide car turnover means including working and idling turnover devices of basically similar construction for attachement to a car in aligned relation for turning thereof about a horizontal axis passing substantially through its center of gravity.

Other objects, advantages, and features of the invention will be apparent to those skilled in the art from the following description, taken in conjunction with the accompanying drawings, in which.

Figure 1:
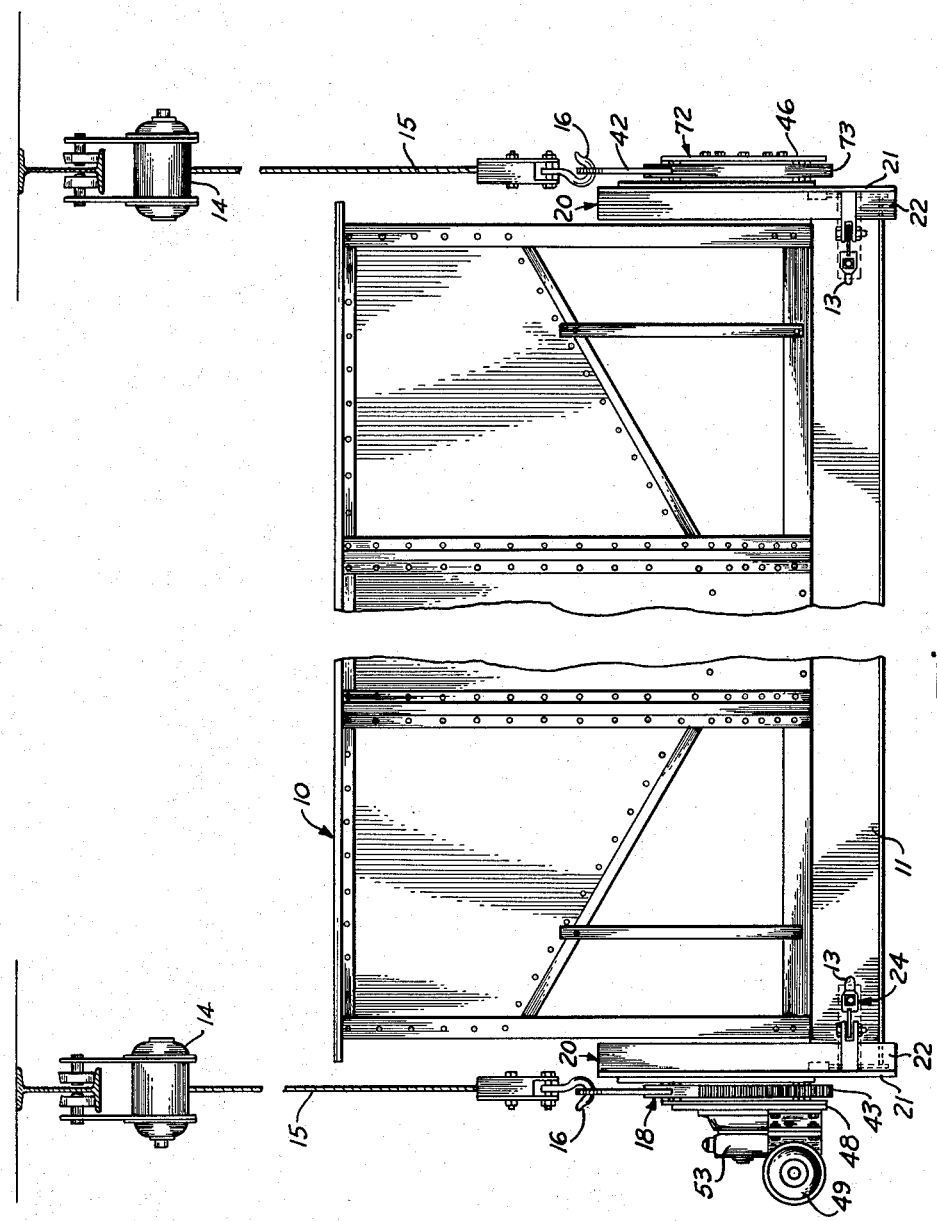
Fig. 1 is a broken side elevation of a railway car body with the turnover and idling devices applied to opposite ends thereof.
Figure 2:
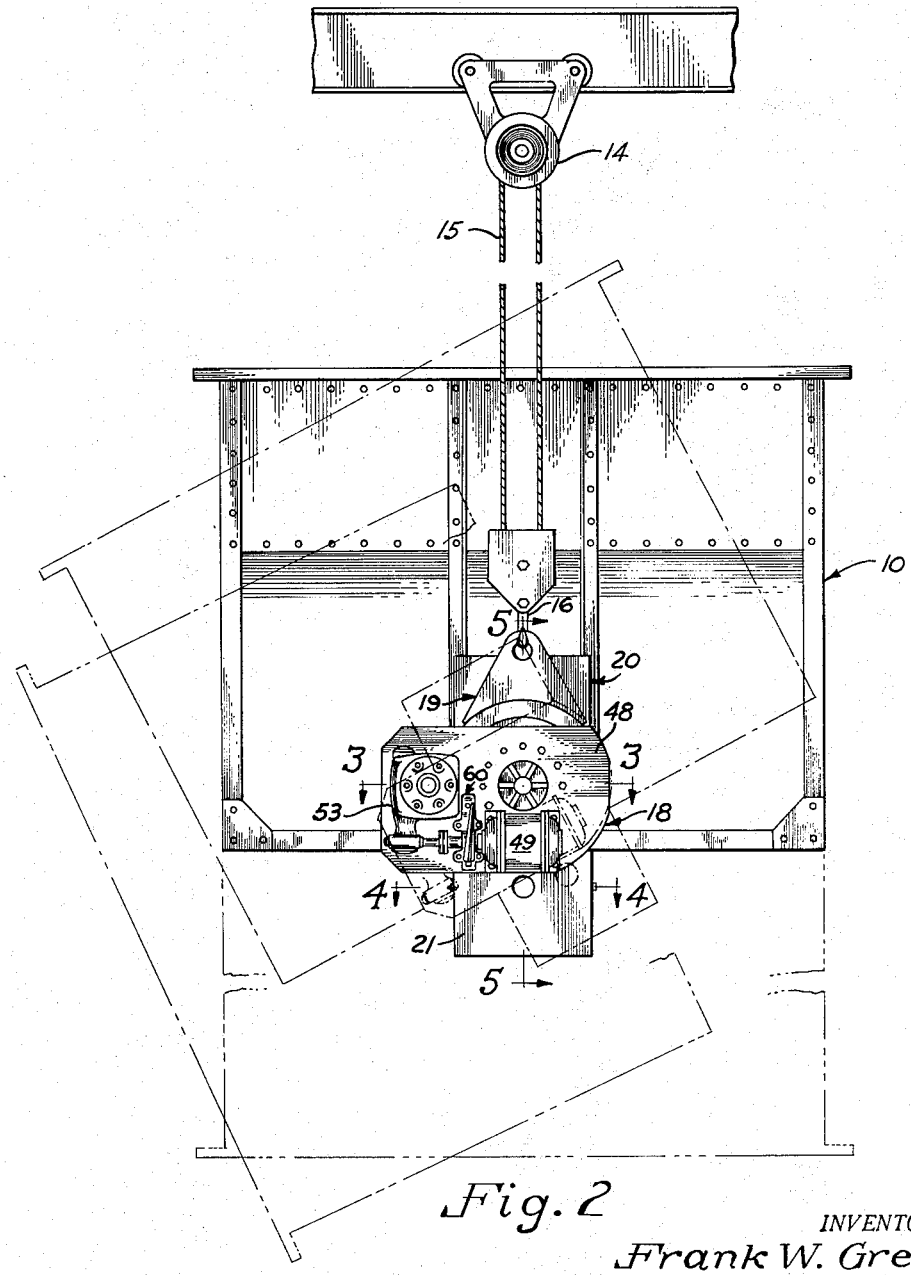
Fig. 2 is an end elevation of the car and turnover device as seen in Fig. 1, with other positions indicated by broken lines.

Referring to the drawings, it will be seen that the turnover device is shown as applied to a railway car, although as already mentioned it is not limited to such application. In Figs. 1 and 2 there is shown a railway car body 10, in this case of the hopper type, which is secured on an underframe including a center sill 11 having in each end the usual striking casting 12, commonly called a striker, with draft key slots 13 formed in the sides of the sill and striker. The car body and underframe, which for convenience will hereinafter be referred to simply as a car, is suspended from traveling hoists 14 by cables 15 and hooks 16 carrying the turnover device and idling device attached to the car at opposite ends.

The turnover device 18 comprises essentially a supporting member 19 and an attaching member 20 rotatably carried by the supporting member, with coacting operating means for rotating the attaching member.

Figure 4:
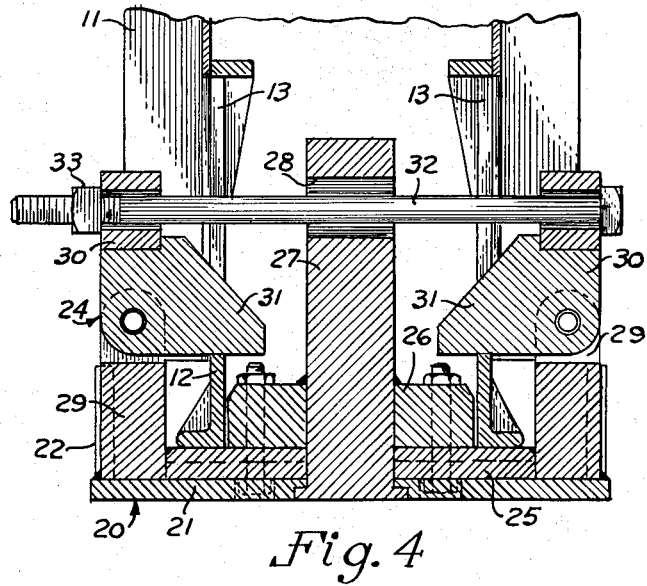
Fig. 4 is an enlarged horizontal sectional view taken substantially as indicated by the line 4—4 of Fig. 2.

The attaching member 20 comprises an elongated steel plate 21 for disposition with one face adjacent an end of the car, and reinforced by side and top flanges 22 on that face and transverse reinforcements 23 extending between the side flanges. The plate is somewhat wider than the outer end of the striker 12, and may be of any suitable length. At its lower end the plate 21 is provided with securing means 24 for attachment to the car center sill 11. A pad 25 is welded to the plate between the side flanges 22, and a turning or thrust block 26 is secured to the pad and plate by bolts preferably with their heads countersunk in the plate. The block 26 is of such dimensions as to fit closely, except for necessary tolerances, in the open end of the striker 12 and to extend into the striker a distance less than the spacing of the outer ends of the draft key slots 13 from the end of the striker. The thrust block constitutes the means by which the turning force of the device 18 is applied to the car. The plate 21, pad 25, and block 26 are apertured for the reception of a locking pin 27 which projects therethrough, in the plane of the slots 13 and of such length as to extend between the slots when the block is disposed in the striker. The pin is welded to the block and plate with its secured end flush with the plate, and has a transverse slot 28 therein adjacent its free end. Welded or otherwise secured to the sides of the plate 21 in the plane of the pin 27 are lugs 29 with horizontal slots in their free ends to provide ears between which locking levers 30 are pivoted by suitable bolts or the like. The levers 30 have slightly elongated slots in their ends for alignment with the slot 28 of the locking pin 27, and adjacent their pivoted ends have clamping projections 31 adapted to extend into the slots 13 and engage against the outer ends thereof when the levers are swung substantially parallel to the center sill 11. A locking bolt 32 is provided to extend through the slots in the levers 30, pin 27, and center sill and striker and to receive a tightening nut 33 on one end. When the turnover device 18 is applied to a car, the attaching member 20 is disposed perpendicular to the center sill 11 with the thrust block 26 and pin 27 inserted in the striker 12, and the lugs 29 and locking levers 30 extending along the outer sides thereof, the clamping projections 31 engaging in the slots 13. The bolt 32 is disposed to extend through the several slots and the nut 33 is tightened thereon to draw the ends of the levers 30 toward each other and bring the projections 31 into tight engagement with the ends of the slots 13, securely clamping the attaching member to the center sill, as best shown in Fig. 4. The attaching member is thus secured in substantially rigid relation to the car 10, and the parts are safely locked against accidental disengagement. Instead of the locking levers and bolt, other means may be employed to lock the parts against disengagement, as for example a wedge member to extend through the slots 13 and a cooperating slot in the pin 27 similar to the slot 28, by which the plate 21 is drawn tightly against the end of the striker 12. Still other means might be employed for operatively attaching the turnover device 18 to a car.

Figure 3:
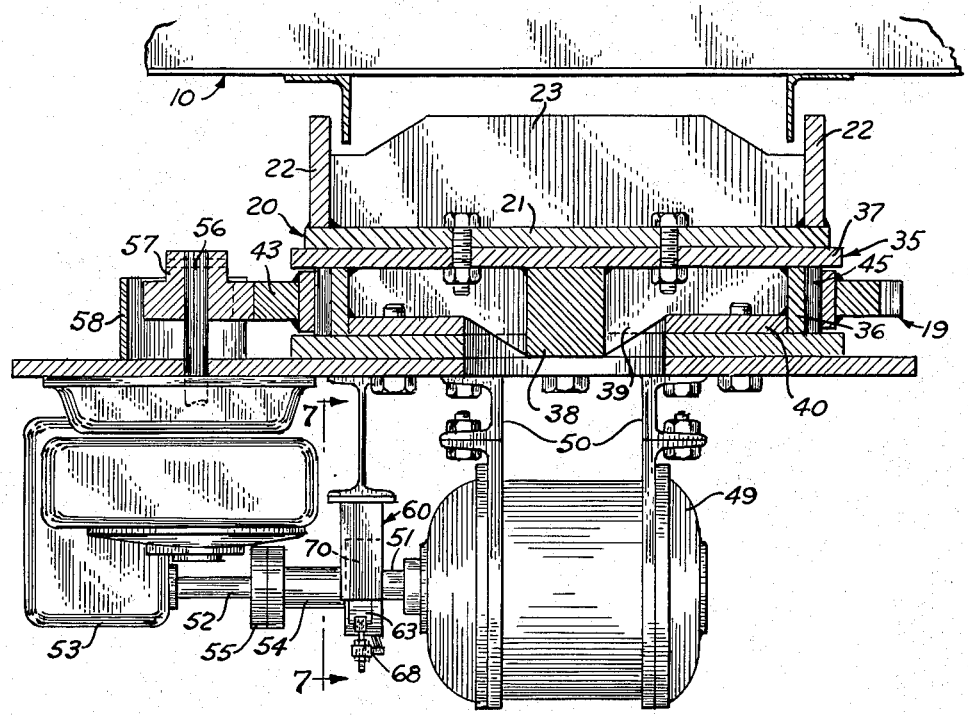
Fig. 3 is an enlarged horizontal sectional view taken substantially as indicated by the line 3—3 of Fig. 2.
Figure 5:
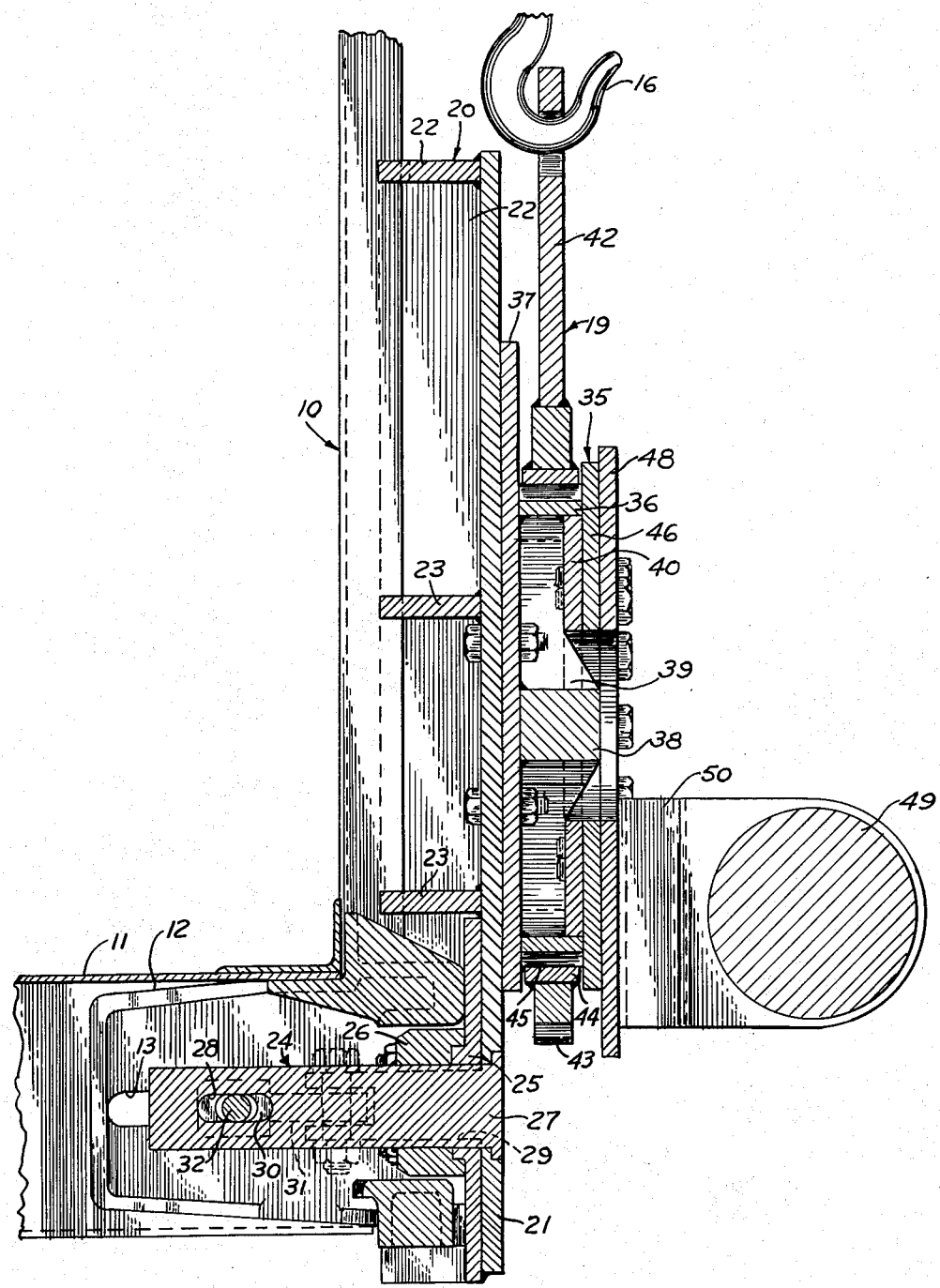
Fig. 5 is an enlarged vertical sectional view taken substantially as indicated by the line 5—5 of Fig. 2.
Figure 6:
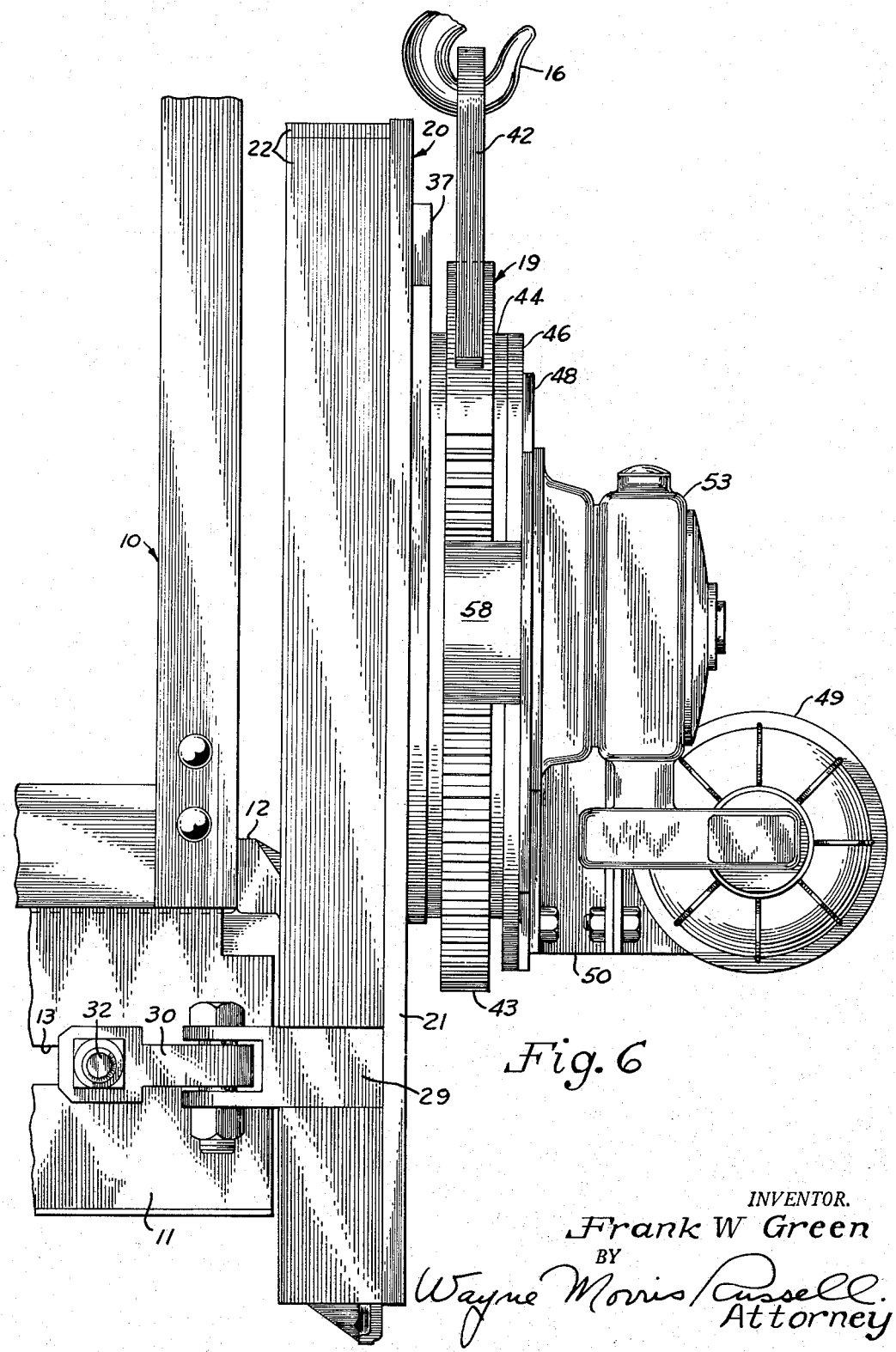
Fig. 6 is an enlarged side elevation of the turnover device and adjacent part of the car, taken from the side opposite that shown in Fig. 1.

A cylindrical roller or shaft element 35 projects from the face of the plate 21 opposite that from which the securing means 24 extend, and is shown as formed by a roller ring 36 of relatively large diameter, slightly less than the width of the plate 21, and of a length or axial extent providing a substantial bearing portion or surface. One edge of the ring 36 is welded to a plate 37 which is secured by a number of bolts or the like to the plate 21, and a hub 38 of a length greater than that of the ring is also welded to the plate 37 centrally of the ring. A number of strengthening webs 39 are disposed radially between the hub and ring and are suitably welded in place. The webs at their radially outer portions are of such width that the edges lie within and parallel to the unsecured edge of the ring 36, while their radially inner portions are widened to have the edge portions extend at an angle out to the free end of the hub 38, as best shown in Figs. 3 and 5. An annular plate 40 is welded to the inner circumference or face of the ring and the outer portions of the webs, substantially flush with the ring edge. A plurality of threaded holes are formed in the plate 40 for the securement of attaching bolts as hereinafter explained. The shaft element 35 is so located relative to the thrust block 26 that its axis will pass substantially through the center of gravity of the car when the attaching member is secured to the car as described above.

The supporting member 19 comprises, in the present case, a generally triangular suspension plate 42 with a hole for the hook 16 at its upper end and an external ring gear 43 depending from its lower edge, the gear being formed with a blank peripheral portion which is welded to the suspension plate 42. If desired, the ring gear may be formed complete and secured to one face of the plate 42 with a registering aperture formed in the latter, but the construction shown, with teeth formed on about three-fourths of the gear circumference, is ample for permitting the turning of the car to any desired position. The ring gear 43 has an inner diameter greater than the diameter of the roller ring 36, and is provided with a relatively broad hub or bearing portion 44, also larger than the ring 36, conveniently formed as an annulus fitting the inner circumference of the gear and welded thereto. The shaft element 35 of the attaching member 20 is disposed in the bearing portion 44, with rollers 45 or other suitable anti-friction bearing elements inserted between the races provided by the inner face of the bearing portion 44 and the outer face of the ring 36. An apertured roller retainer plate 46 of sufficient outer diameter to extend over the rollers 45 and bearing portion 44 is secured to the annular plate 40 of the shaft element 35 as hereafter explained to retain the rollers and ring gear in assembly with the shaft element, the retainer plate 46 preferably being of such thickness as to lie flush with the end of the hub 38 of the roller ring 36. The attaching member 20 is thus rotatably supported by the supporting member 19 for rotation about the axis of the ring gear 43, its shaft element 35 being concentrically journaled in the ring gear itself. It will be seen that the axis of rotation of the attaching member 20 thus passes substantially through the center of gravity of the car when the device is applied thereto, due to the relative location of the thrust block 26 and shaft element 35 previously explained. It will also be clear that the attaching member acts as a crank applying the turning force of the turnover device 18 to the car 10 at a distance from the rotational axis, and thus helps to minimize any unbalance resulting from any inexact alignment of the rotational axis with the car center of gravity. The relationship of the turning axis and center of gravity need not be precise, and the same device 18 may be used for different types of cars having more or less similarly located centers of gravity, and of course may be employed, with less advantage, without regard to the relative location of the center of gravity. If desired, the shaft element 35 may be arranged for variable or adjustable securement to the attaching member 20, as by providing more than one group or series of bolt holes in the plate 21 for attachment of the plate 37. The spacing of the shaft element 35 from the thrust block 26 may thus be changed to correspond more closely to the center of gravity.

Figure 8:
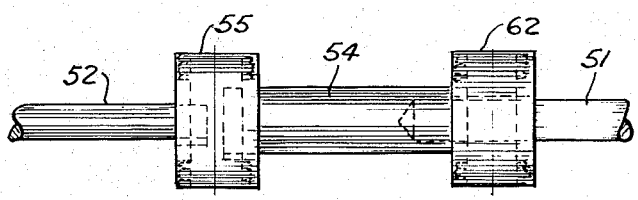
Fig. 8 is fragmentary elevational view of the shaft and coupling arrangement of the motor and reducer.
Figure 9:
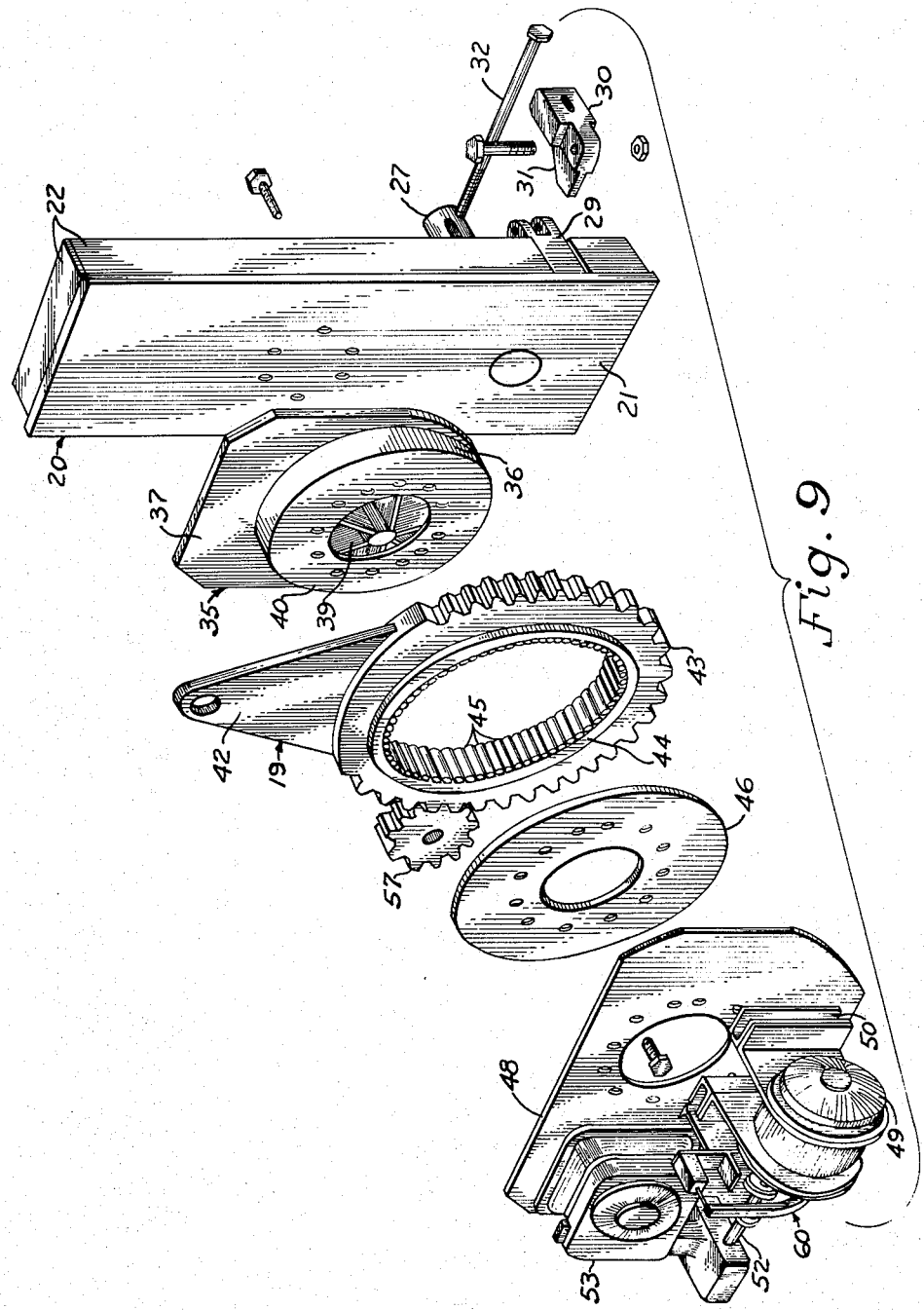
Fig. 9 is an exploded perspective view of the turnover device.

A mounting plate 48 for the drive means of the turnover device is provided, arranged parallel to the plate 21 and secured to the shaft element 35 with the retainer plate 46 therebetween by bolts extending through holes in the mounting plate and retainer plate registering with the threaded holes in the annular plate 40 of the shaft element, as shown in Fig. 5. The mounting plate 48, which may be apertured in registry with the plates 37 and 40, is thus fixed relative to the attaching member and in effect is a part thereof disposed on the opposite side of the gear 43 from the attaching plate 21. A reversible electric motor 49 is suitably bolted or otherwise secured to the mounting plate, and may be spaced therefrom by channel members 50 or other appropriate means to align its drive shaft 51 with the input shaft 52 of a speed reducer 53 also carried by the mounting plate. A coupling shaft 54 of greater diameter than the drive shaft connects the two shafts in driving relation, being coupled at one end to the input shaft 52 by a conventional coupling 55, and having at the other end a recess into which the drive shaft 51 extends for direct driving connection by a feather or key, as will be clear from Fig. 8. The speed reducer 53 has an output shaft 56 perpendicular to the input shaft and projecting through a suitable aperture in the mounting plate 48 to a point radially outward of the ring gear 43, and a pinion 57 in mesh with the gear is fixed on the shaft. A guard or shield 58 for the pinion may be secured to the mounting plate. Actuation of the motor 49 causes rotation of the pinion 57 for epicycloidal travel on the substantially fixed gear 43, moving the shaft 56 in an arcuate path about the gear and causing the mounting plate 48 to rotate the shaft element 35 of the attaching member 20 in the gear, so that the attaching member is rotated about the gear axis. In the upright position assumed by the attaching member 20 when applied to a car in normal position, the pinion 57 engages the ring gear substantially 90° from the center of the blank portion secured to the suspending plate 42, and since as already indicated the gear teeth extend through substantially 270°, clockwise rotation of the pinion as viewed in Fig. 9 is permitted, with resulting clockwise travel thereof on the gear through about 45° to turn the attaching member and car clockwise as viewed in Fig. 2. Counterclockwise rotation of the pinion causes rotation of the car counterclockwise from the full line position of Fig. 2 through the broken line positions, so that the car may be turned completely upside down, or 180°, and some 45° further if desired.

In the present instance, an external ring gear 43 is employed in the supporting member, but it will be evident that an internal ring gear may be used with the attaching member still arranged to rotate about the gear axis, the pinion traveling on the internal gear in hypocycloidal relation. The invention therefore contemplates that the motion of the pinion be epicyclic, as including both epicycloidal and hypocycloidal movement. It may also be pointed out that although the turnover device is shown as supported from above by suitable suspending means, it is obviously entirely practical to support the device from below instead, as by a movable jack, without appreciable loss of any of the advantages provided by the device. Support by a jack is mentioned because it is ordinarily necessary to raise the car somewhat so that when turned it will clear the track or other means on which it rested, or to permit removal of trucks or other conveying means on which it was brought to the location at which it is to be turned.

Figure 7:
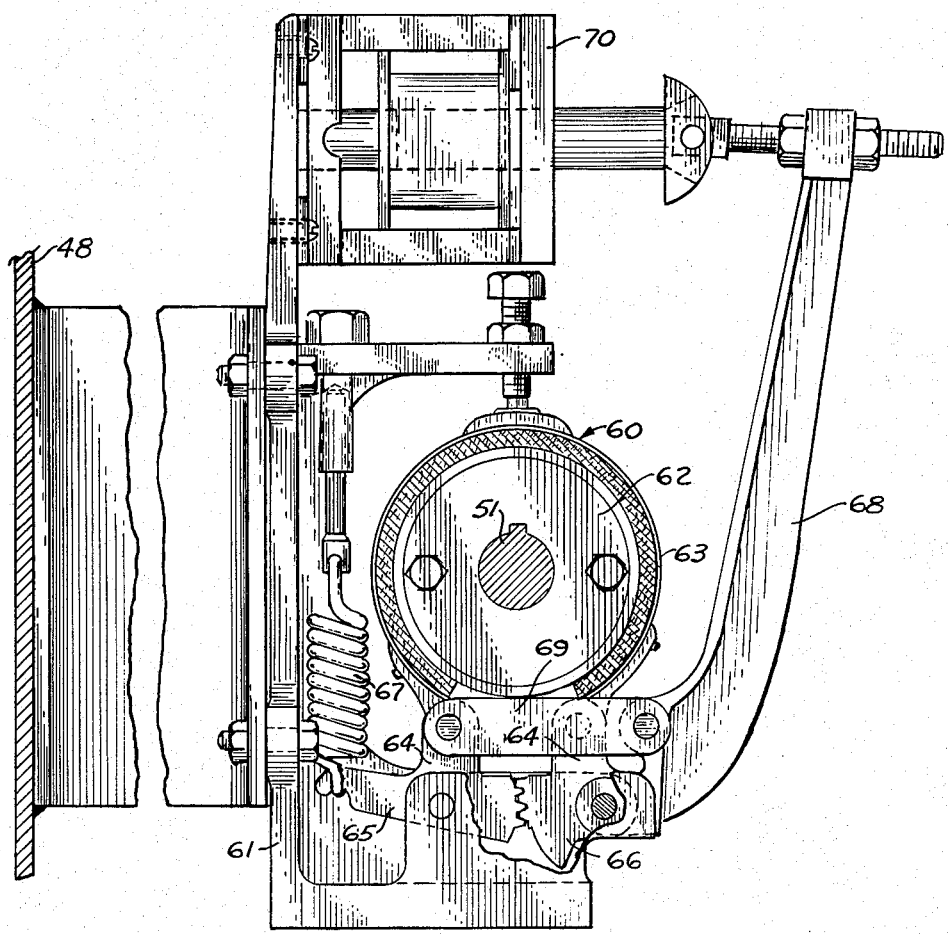
Fig. 7 is a vertical sectional view taken substantially on the line 7—7 of Fig. 3, showing the load brake in elevation with a part broken away.

To permit the attaching member 20, and thereby the car 10, to be disposed in any desired rotated position relative to the gear 43, a load brake 60 is provided. In the present embodiment, as best shown in Fig. 7, the brake comprises a bracket 61 bolted on an I-beam spacer welded to the mounting plate 48, so as to be held adjacent the drive shaft 51 of motor 49. The bracket has a portion extending below the shaft, on which is fixed a brake drum 62. A brake band 63 extends around the drum with its ends secured to a pair of lugs 64 extending from brake applying members 65 and 66 pivoted at spaced points between parallel upstanding parts of the lower bracket portion. One end of the member 65 extends toward the mounting plate and is biased to swing upwardly by a tension spring 67 adjustably suspended from an upper part of the bracket. The other end of the member 65 has cogs engaging with cooperating cogs on the member 66, so that the spring 67 causes the applying members to pivot and swing their lugs 64 toward each other and thus clamp the brake band against the drum. A releasing lever 68 has a lower end swinging on the same pivot as the member 66, and is connected to the lug 64 of the applying member 65 by a pair of links 69. The upper end of the lever 68 is connected to the core of a solenoid 70 mounted at the top of bracket 61 and which when energized draws the core inwardly to swing the lever so as to rotate the applying member 65, through the links 69 and lug 54, against the force of the spring 67 so that the members 65 and 66 swing the lugs 64 away from each other and release the brake band. When the solenoid 70 is deenergized, the spring applies the brake band and swings the lever 68 to move the core outwardly in the solenoid. The solenoid is arranged in circuit with the motor 49 so that it is energized and deenergized in accordance with actuation and non-actuation of the motor. Thus the brake does not interfere with the driving means during operation thereof, but holds the motor shaft 51 stationary when the driving means are inoperative. Obviously, when the shaft 51 is held against rotation, the pinion 57 cannot rotate and is locked with the ring gear 43, so that the mounting plate 48 and attaching member 20 cannot rotate relative to the gear. The attaching member and the associated car may therefore be rotated to a desired position relative to the gear by operation of the driving means and fixed in that position immediately upon stopping of the driving means when the position is reached, the load brake being applied instantaneously upon opening of the motor circuit.

The idling device 72 is practically identical to the turnover device 18 so far as the provision of the attaching member rotatably carried by the supporting member is concerned, but since it does not need driving means, the mounting plate 48, motor 49, speed reducer 53, pinion 57, the several shafts, and the load brake are omitted therefrom. The ring gear 43 may be employed if desired, but it is more economical to substitute for it a simple apertured plate 73 or like member, which obviously may be integral with the suspension plate 42. The attaching member is provided with the shaft element rotatably disposed in the ring gear 43 or apertured member 73 and with the retainer plate 46, and also has the securing means 24 of the turnover device. The axis of rotation of the idling device attaching member is the same as in the turnover device. The idling device, of course, operates in substantially the same manner as the turnover device 18, but it is caused to rotate in accordance with the turnover device through the connection provided by the center sill 11. In other words, it is rotated by the car rather than itself turning the car, as does the turnover device. Although other means may be used for rotatably supporting the end of the car opposite the turnover device, the idling device 72 is preferred because its general similarity to the turnover device not only reduces the number of diverse parts required in manufacture but also facilitates uniform operation at both ends of the car and uniform positioning thereof.

In operation, the devices 18 and 72 are attached to opposite ends of the car 10 by inserting the thrust blocks in the respective strikers 12 and securing the locking means, the devices being preferably brought to position by means of the hoists 14, or equivalent means. The devices are then raised to lift the car from its support and provide turning clearance therebelow. The load brake 60 is in applied position, holding the car against turning. The motor 49 of the working turnover device 18 is set in operation, the load brake being simultaneously released, and the attaching member 20 of the device 18 is thereby rotated to turn the car about an axis determined by the rotational axes of the devices 18 and 72, which of course are in alignment since the devices are of the same proportions, and this axis passes through the center of gravity of the car, or substantially so. When the car is brought to the desired turned position, the motor 49 is stopped and the load brake is immediately applied as the result of the stoppage, so that the car is held fixed in its turned position. It may be mentioned that the weight of the car is sufficient to hold the supporting members 19 against any substantial rotation about the rotational axis of the car. Thus even though the supporting members at the opposite ends of the car are suspended in movable or swingable relation, they are in effect fixed by the weight they support, and the attaching members 20 rotate thereon. It will be evident that by means of the traveling hoists 14 or equivalent devices, the turnover and idling devices 18 and 72 may be used to move the car, in either upright or turned position, from one spot to another, such mobility often being of great advantage.

While the invention is disclosed in connection with a railway car, the turnover device may of course be used for other articles or objects which present similar difficulties in handling, several of which have previously been mentioned, the disclosed securing means being modified or adapted to the particular article if necessary or desirable. The term "car" as employed herein therefore is not intended to limit the invention to use with railway cars, but to include all such articles or objects unless the context clearly indicates the contrary.

What I claim is:

1. A turnover device for a car having a rigid tubular member of non-circular section, comprising a supporting member, an external ring gear secured to the supporting member, an attaching member having securing means for attachment thereof to said tubular car member, said securing means including a rigid thrust block corresponding to the section of the tubular member and engageable in the end thereof and means to lock the block against disengagement therefrom, a shaft element fixed to the attaching member journaled in said gear to support the attaching member for rotation about the gear axis, driving means fixed to the attaching member, a pinion on the driving means and driven thereby in mesh with the gear for epicycloidal travel thereon to rotate the attaching member, and means fixedly mounted relative to said attaching member for holding the attaching member in selected rotated position relative to the gear, said holding means including a brake applicable to prevent pinion travel, biasing means urging the brake to applied position, and solenoid means energized and deenergized in accordance with actuation and non-actuation of the driving means acting against the biasing means to dispose the brake in released position when energized and causing application of the brake when deenergized.

2. A car turnover device comprising a supporting member, an external ring gear secured to the supporting member, an attaching member having securing means for attachment thereof to a car, a shaft element fixed to the attaching member journaled in said gear to mount the attaching member for rotation about the gear axis, driving means fixed to the attaching member, a pinion operatively carried by the driving means in mesh with the gear for epicycloidal travel thereon to rotate the attaching member, and means fixedly mounted relative to said attaching member for holding the attaching member in selected rotated position relative to the gear, said holding means including a brake applicable to prevent pinion travel, biasing means urging the brake to applied position, and solenoid means energized and deenergized in accordance with actuation and non-actuation of the driving means acting against the biasing means to release the brake when energized and causing brake application when deenergized.

3. A car turnover device comprising a supporting member, circular gear means fixed to the supporting member, an attaching member, a shaft element fixed to the attaching member journaled in said gear means to support the attaching member for rotation about the axis of said gear means, securing means on the attaching member for attachment thereof to a car, driving means fixed to the attaching member, a pinion rotatable by the driving means meshing with said gear means for epicyclic travel thereon to rotate the attaching member, and means fixedly mounted relative to the attaching member operable to prevent rotation of the pinion for holding the attaching member in selected rotated position relative to the gear means.

4. A car turnover device comprising a supporting member including fixed circular gear means, an attaching member, a shaft element fixed to the attaching member journaled in said gear means to support the attaching member for rotation about the axis of the gear means, securing means on the attaching member for attachment thereof to a car, driving means carried by the attaching member, a pinion operatively carried by the driving means in mesh with the gear means for epicyclic travel thereon to rotate the attaching member, a load brake fixedly mounted relative to the attaching member applicable to prevent travel of the pinion for holding the attaching member against rotation relative to the gear means during non-actuation of the driving means, biasing means urging the brake to applied position, and solenoid means energized during operation of the driving means to maintain the brake released against the action of the biasing means and deenergized during non-actuation of the driving means to cause application of the brake.

References Cited in the file of this patent

UNITED STATES PATENTS

| 1,697,538 | Moore | Jan. 1, 1929 |
| 2,383,503 | Landis et al. | Aug. 28, 1945 |
| 2,530,016 | Landis et al. | Nov. 14, 1950 |
| 2,634,000 | Ulrich | Apr. 7, 1953 |